Patented Dec. 17, 1929

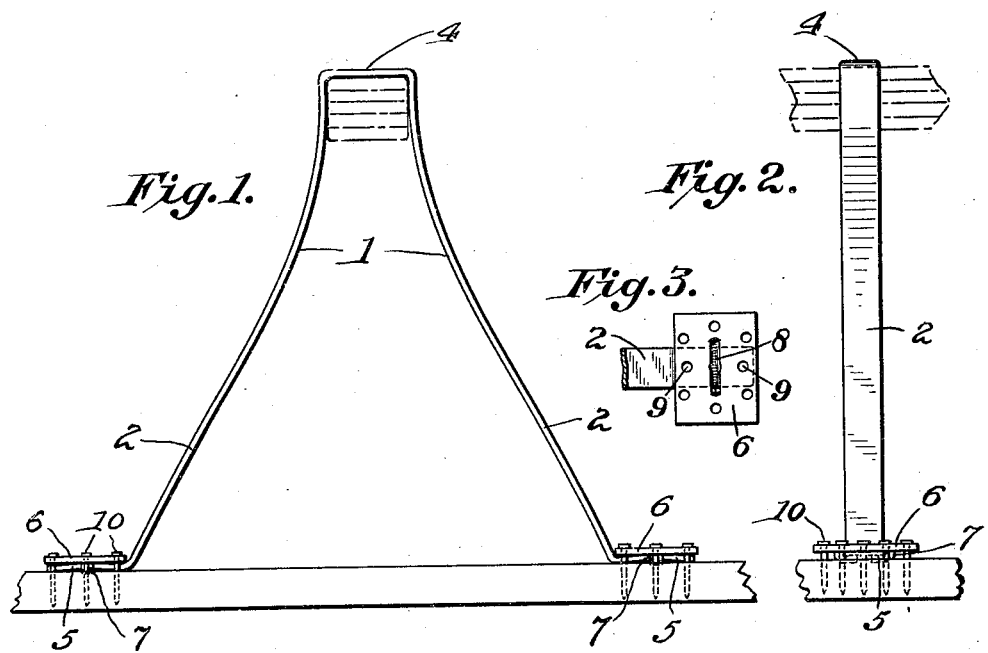

1,739,828

UNITED STATES PATENT OFFICE

GEORGE C. FEDDERMAN, OF DETROIT, MICHIGAN, ASSIGNOR TO AUTO LOADING DEVICE MANUFACTURING COMPANY, OF DETROIT, MICHIGAN, A CORPORATION OF MICHIGAN

HOLD-DOWN DEVICE

Application filed June 16, 1927. Serial No. 199,302.

My present invention relates to a hold down device designed particularly for securing an automobile to the floor of a freight car or the like while being transported.

The principal object of the invention is the provision in a device of the type described of a foot plate to assist in holding the foot to the floor which plate is attached to the foot so that the two parts will not become accidentally displaced in shipment or other handling, yet may be assembled in a quick, cheap and efficient manner.

To this end the invention contemplates a hold down of the type described comprising member adapted to be looped over some part of the vehicle so as to form two depending legs. Each leg is turned outwardly to form a foot, and a plate provided for each foot to assist in holding the same to the floor or other surface. The plate preferably has punched out tongues to embrace the foot and then that portion of the foot embraced by the tongues is struck a blow or otherwise deformed slightly into the place or aperture in the plate formed by punching out the tongues. This produces a slight offset in the foot which serves to effectively keep the plate from slipping off the foot while the hold downs per se are being shipped.

The invention further consists in the novel construction, arrangement and combination of parts herein shown and described.

In the drawings:—

Fig. 1 is a front elevation of the preferred form of the device.

Fig. 2 is a side elevation of the same.

Fig. 3 is a top plan of one of the foot members, with the leg broken away.

Fig. 4 is an enlarged sectional detail taken transversely of the leg.

Fig. 5 is a similar view at right angles to Fig. 4.

Fig. 6 is a fragmental front view of a slightly modified form of the device.

Referring now with particularity to the embodiment illustrated, I have shown at 1 a comparatively narrow band or strap of metal having legs 2 and a curved or arched portion 3 adapted to pass over an automobile hub, axle or the like. In a preferred form the legs 2 are joined by a horizontal portion 4 adapted to pass over an automobile spring.

Each leg 2 terminates in a bent-out foot 5 adapted to lie flat upon the floor.

A foot plate 6 of greater width than the foot is provided having two punched out tongues 7 embracing the foot 5. In punching out the tongues 7 an aperture is left in the foot and after the foot and plate are assembled together the two are struck a blow to the end that that portion of the foot embraced by the tongues may be slightly deformed into this aperture. This produces an offset shown in an exaggerated condition at 8. This effectively prevents the plate from slipping off the foot both during shipment of the devices per se and also assists in holding the foot to the floor.

Holes 9 are provided in both foot plate and foot, some of which coincide, in order to receive nails 10 by which means the device is secured to the floor.

It is preferable that the plate overlie the foot which gives a greater pressure upon the foot due to the area of the plate.

This particular combination of elements has been found to be desirable in that it affords a quick, cheap and efficient method of attaching the plate to the foot without the use of rivets or the like.

It has been found to be expedient to form the tongues 7 by first punching an aperture of the same size as a nail hole and preferably at the same time and then punch out along two parallel lines the two tongues. The foot is then threaded between the main body of the plate and the tongues and the parts thus assembled struck a blow thus deforming the foot into the aperture formerly occupied by the tongues and the parts thereby made secure.

What is claimed is:

1. A hold down device having a leg and a foot, a reenforcing plate for said foot, said plate having a tongue struck out from the plate within the margin thereof and engaging the foot, the main body of the plate being on one side of the foot, the struck out portion being on the other, the said tongue and foot being deformed so that the foot enters slightly into the opening left in the plate by striking out the tongue.

2. A hold down device having a leg, a foot on said leg, a plate overlying said foot and having struck out portions embracing said foot, the foot and the struck out portions being deformed to retain the foot and plate in substantially immovable relation.

3. A hold down device having a leg and a foot, a reenforcing plate for said foot, said plate having two struck out tongues embracing the foot, that portion of the foot gripped by the tongues being deformed into the opening in the plate formed by striking out the tongues.

4. A hold down device having legs, a foot on each leg, a reenforcing plate overlying each foot, each plate having a tongue struck therefrom and underlying its respective foot, said tongue and that portion of the foot in contact therewith being deformed so that the foot enters slightly into the opening in the plate formed by striking out the tongue.

In testimony whereof, I affix my signature.

GEORGE C. FEDDERMAN.